Sept. 9, 1930.　　　　R. H. PARK　　　1,775,536
REGULATING SYSTEM
Original Filed Nov. 26, 1927
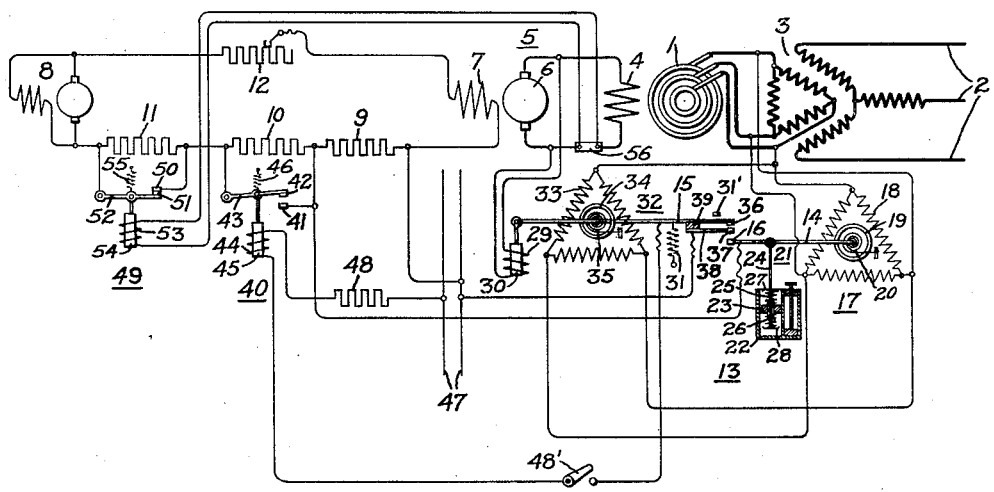
Inventor:
Robert H. Park,
by　　　　
His Attorney.

Patented Sept. 9, 1930

1,775,536

UNITED STATES PATENT OFFICE

ROBERT H. PARK, OF SCOTIA, NEW YORK, ASSIGNOR TO GENERAL ELECTRIC COMPANY, A CORPORATION OF NEW YORK

REGULATING SYSTEM

Application filed November 26, 1927, Serial No. 235,970. Renewed February 1, 1930.

My invention relates to regulating systems and more particularly to regulating systems for the synchronous apparatus of power transmission systems.

The advent of extensive transmission system involving long power lines and the interconnection of large aggregations of generating capacity has been accompanied by a profound consideration of the problem of increasing the power that can be transmitted economically with stability over lines and systems of varying extent. The stability limit of power transmission system including synchronous generators, synchronous motors and synchronous condensers is largely determined by the amount of load which can be added to the system either gradually or suddenly, by the short circuits that can be sustained, and by the voltage drop that may be permitted at the terminals of the synchronous apparatus or at other points in the system without causing loss of synchronism or instability between the various synchronous units of the system. Under conditions of gradually applied loads the maximum load which can be transmitted without causing instability is known as the steady state limit, while under conditions of suddenly applied loads and short circuits, or any line disturbances causing operation under transient conditions the limit is known as the transient limit. Instability under transient conditions may be due to increased load unaccompanied by a decrease in voltage, or to the combination of increased load and a drop in voltage occasioned thereby, or to a short circuit of such a nature as merely to cause a drop in voltage without adding a kilowatt load to the system.

One avenue of approach to the problem of increasing the stability limit of transmission systems has been through improvements in the excitation systems of the synchronous equipment. Various so-called "quick response" excitation systems have been proposed but by recent studies I have found that a material improvement in the stability limits of transmission systems under transient conditions incident to short circuits in the system is not obtained when the known methods and means of varying the field current are employed.

It is an object of my invention to provide an improved regulating system for increasing the stability limit of power transmission systems.

Another object of my invention is to provide a new and improved method and means for increasing the output of the synchronous apparatus of a power transmission system when sudden large increments of load or short circuits are imposed upon the system.

A further object of my invention is to provide a new and improved method and means for materially increasing the flux of the synchronous machines of a power transmission system during line disturbances incident to short circuits or large and sudden increments of load.

Although my invention is adapted generally to improving the stability limits of power transmission systems, it is particularly adapted for improving the stability limit of power transmission systems under short circuit conditions or conditions incident to the application of sudden relatively large increments of load. It is desirable to note the difference between the excitation requirements for improving stability when operating under conditions of dynamic stability; that is, when operating above the steady state power limit, and when operating under conditions of short circuit. In the former case it is not so important to have the field current change at a high rate as it is to obtain the proper time phase relationship between the inherent oscillatory motion of the synchronous machine rotors and the variation of the corrective field excitation of the synchronous machines. In the latter case, however, a high rate of change of field current is important and the paramount requirement is quickly to obtain a large increase in excitation upon the occurrence of a disturbance incident to short circuit conditions which will not only sustain the machine flux but will also effect an increase in flux and thereby increase the kilovolt-amperes output of the synchronous machines.

In order to obtain a change in field excitation which will materially improve stability, particularly under short circuit conditions, I have found that the voltage applied to the field of the synchronous machine should not only have a high rate of change and be quickly applied but it should also be increased to a value several times higher, preferably two to four times higher, than the voltage necessary in accordance with Ohm's law to circulate the normal continuous rated full load field current through the field winding of the synchronous machines.

One embodiment of my invention, which has been found to give satisfactory and reliable results, includes the use of an exciter for the field winding of the synchronous machine whose voltage can be increased to a value several times higher than the voltage necessary in accordance with Ohm's law to circulate normal continuous rated full load field current through the field to which it is connected. An exciter having the above-mentioned characteristics may for convenience of differentiation from prior art practice be designated as a "high-ceiling" exciter since the maximum terminal voltage or "ceiling" that can be obtained from an exciter constructed in accordance with the usual practice is only about 30% higher than the full load field voltage of the machine to which it is to be connected, whereas an exciter of the present invention is arranged to have a ceiling of, for example, from 100% or more of the full load field voltage. In the prior art, a nominally rated 250 volt exciter has a ceiling of about 320 volts whereas an exciter suitable for use for carrying out the principles of my invention may, for example, comprise an exciter with a ceiling of about 1000 volts when intended for use with a 250 volt field winding. An exciter of the latter type can increase the voltage applied to a 250 volt field to about 1000 volts at a rate of change of voltage of from 6000 volts to 7000 volts per second in contrast to prior art practice where the voltage is increased to 320 volts with a maximum rate of change of voltage of from 400 to 600 volts per second. The prior art practice of increasing the field voltage to that value of voltage required by Ohm's law to maintain the desired field current at its steady state value through the field circuit, can barely sustain the flux of the synchronous machine under short circuit conditions, even assuming the voltage has an infinite rate of change instead of merely 400 to 600 volts per second. Hence it is quite apparent that the excitation systems heretofore used lack many of the factors necessary for effecting a material improvement in stability under short circuit conditions.

The novel features which I believe to be characteristic of my invention are set forth with particularity in the appended claims.

The invention itself, however, both as to organization and method of operation, together with further objects and advantages thereof, will best be understood by reference to the following description taken in connection with the accompanying drawing in which the single figure is a diagrammatic representation of a regulating system embodying my invention.

Referring to the drawing which is a diagrammatic representation of a power transmission system wherein my invention has been embodied, 1 indicates a synchronous dynamo-electric machine which is connected to a transmission line or distribution circuit 2 through a suitable transformer 3. The synchronous machine 1 is provided with a field winding 4 which is supplied with an exciting current from a source of direct current shown as a dynamo-electric machine or exciter 5. The exciter 5 comprises an armature 6 which is connected to energize field winding 4, and a field winding 7 which is preferably excited from a separate source of electrical energy indicated by a dynamo-electric machine or sub-exciter 8. The exciter 5 may be constructed according to known principles of design and has its armature and commutator constructed in accordance with the design practice for building a machine capable of operating for limited time intervals at the ceiling voltage desired. For example, in a 30,000 kilovolt-ampere condenser excitation system the main exciter which is to be connected to a 250 volt field and normally operated within the range of a 250 volt exciter has an armature and commutator construction corresponding to a 750 volt machine. This machine then provides a ceiling voltage of about 1000 volts. The yoke and field cores may be of usual construction but the field winding circuit preferably is designed to have a low time constant in order to permit a high rate of change of exciter field current. Such low time constant may be secured in any suitable way examples of which are well known in the art.

A plurality of resistors 9, 10, 11 and 12 are inserted in series with the field winding 7 of the main exciter 5 in the embodiment of my invention illustrated. The resistor 9 is utilized to vary the main exciter field current during variations of a predetermined amount from a predetermined value of an electrical characteristic such as the voltage of the synchronous machine 1. The resistor 10 is utilized to increase the main exciter field current and permit the exciter 5 to operate at its ceiling voltage when the decrease in the electrical characteristic regulated exceeds the predetermined amount. The resistor 11 is utilized to limit indirectly the current that may flow in the circuit of field winding 4 by reducing the voltage of exciter 5 when the current in field winding 4 exceeds a predetermined value. The resistor 12 permits the establishment of a definite maximum excitation current for the field winding 7 of the main exciter and thus fixes a definite maximum load on the sub-exciter 8.

The control of resistor 9 may be effected by various types of regulators but for obtaining regulation under steady state and operation above the steady state limit, that is, under dynamic stability, I find it preferable to use a vibratory type of regulator employing the principles described in an application Serial No. 150,608, of Clifford A. Nickle, filed November 24, 1926, and of the form shown and described in my application Serial No. 216,687 filed August 31, 1927, both of which have been assigned to the same assignee as this application. In the first mentioned application of Clifford A. Nickle an arrangement is disclosed whereby upon a change in the voltage regulated, the new required average value of the field excitation is attained in one vibration of the contacts and in the proper phase relation with respect to the inherent oscillatory motion of the synchronous machine rotors, and in my application referred to these principles are employed with the additional provision of means for effecting proper operation of the regulator when used in connection with a polyphase dynamo-electric machine irrespectively of whether the electric characteristic regulated is the same or different in each phase.

Accordingly resistor 9 is controlled by regulator 13 which in the form shown comprises two contact arms 14 and 15. Contact arm 14 carries a contact 16 and is actuated by a dynamo-electric device 17 which comprises a stationary polyphase primary or inducing winding 18 for producing a rotating magnetic field and a rotatable closed circuit secondary or induced member 19. The winding 18 is connected to be energized from all of the phases of the synchronous machine 1. The rotatable member 19 is mechanically connected to actuate contact arm 14 and forms a pivot for this arm. The torque of the rotatable member 19 under predetermined normal conditions in the regulated circuit is counterbalanced by the torque of a spring 20. The winding 18 is arranged on the inner periphery of a stator core member of the type employed for induction motors in the usual manner of a polyphase distributed winding and the rotor member 19 is preferably constructed in the form of a hollow steel shell. The motion of contact arm 14 is modified by damping means connected thereto and shown as a dashpot 21. The dashpot as shown is arranged to permit a quick initial movement of lever 14 followed by a damping action and comprises a cylindrical casing 22, a piston 23 therein, and a shaft 24 slidably extending through said piston and resiliently connected thereto by springs 25 and 26 which bear on opposite sides of the piston and are forced into engagement therewith by retaining members 27 and 28.

The contact arm 15 is actuated by an electromagnetic means comprising a solenoid 29 and a plunger 30 which is mechanically connected to the arm at a point removed from the contact end. The solenoid 29 is arranged to be energized in accordance with an electrical characteristic of the synchronous machine field circuit and as shown is connected to be responsive to the voltage of the field winding 4. A spring 31 is connected to the arm 15 near the contact end and is arranged to oppose the pull of the solenoid 29. Suitable means are provided to limit the movement of the arm 15 when the exciter is operating at its ceiling voltage. Such means may be arranged, for example, in the path of travel of the core 30. In the drawing a stop is diagrammatically indicated at 31'. The arm 15 is also actuated by a dynamo-electric device 32 similar in essential details to the dynamo-electric device 17 and comprises a stationary polyphase primary or inducing winding 33, a rotatable secondary or induced member 34, and a balancing spring 35. The winding 33 is connected to be energized from all of the phases of the synchronous machine 1. The arm 15 is mounted on the rotatable member 34 and its bearings act as a pivot for this arm. The arm 15 carries contacts 36 and 37 positioned to cooperate with contact 16 of arm 14. Contact 36 is mounted on the arm 15 while contact 37 is arranged to be engaged by contact 36 for a predetermined movement thereof and may be mounted on a short plate spring 38 which is spaced from the arm 15 and contact 36 by an insulating and spacing member 39. Contacts 16 and 37 of regulator 32 are shown connected across the resistor 9 for periodically varying the effective value of the resistor 9 in the circuit of field winding 7. In practice the contacts of the regulator will usually be arranged to control the effect of resistor 9 through a relay, but for simplicity such relay has not been illustrated.

The resistor 10 is controlled by an electro-responsive device or switch 40 which is arranged to maintain a circuit in shunt to said resistor normally open circuited. For purposes of illustration, the switch 40 is shown as comprising a stationary contact 41 which is connected to one side of the resistor and a contact 42 mounted on a movable arm 43 which is connected to the other side of said resistor. The contact 42 and movable arm 43 are actuated upon the energization of an electromagnet comprising a solenoid 44 and a plunger 45. Normally contacts 41 and 42 are maintained out of engagement by suitable means such as the spring 46. Solenoid 44 is connected through contacts 36 and 37 to an auxiliary bus 47. A resistor 48 is connected in series with the circuit from the auxiliary bus to limit the current through the solenoid when contacts 36 and 37 are in engagement and a switch 48' in series therewith to permit initiation of the operation of the regulator without causing the exciter to build up to its ceiling voltage. It will occur to those skilled in the art that the energization of solenoid 44 may be controlled by a relay device which is arranged to be responsive to a predetermined variation in the electrical characteristic regulated and having contacts independent of the contacts of the vibratory regulator 13, and may be used if preferred without departing from my invention in its broader aspects.

The resistor 11 is controlled by an electro-responsive device or switch 49 which is arranged normally to short circuit the resistor. The switch 49 is shown as comprising a stationary contact 50 which is connected to one side of the resistor 11 and a contact 51 mounted on a movable arm 52 which is connected to the other side of said resistor. The contact 51 and movable arm 52 are actuated upon a predetermined energization of an electromagnet comprising a solenoid 53 and a plunger 54. Normally contacts 50 and 51 are maintained in engagement by suitable means such as the spring 55. Solenoid 53 is connected to be energized in accordance with current flowing in field winding 4 and as shown is connected to a current shunt 56 connected in series with the field circuit 4. This arrangement is desirable in order to protect field winding 4 when the voltage of exciter 5 increases to its ceiling value and the alternating current voltage has not yet been restored to a value sufficiently high to permit resistor 10 to be inserted.

The operation of the arrangement shown in the drawing is substantially as follows: First assume that contact 16 is in a fixed position, that exciter 8 is in operation, that resistor 11 is short circuited, that the shunt circuit to resistor 10 is open circuited, and that switch 48' is in the open position. If the combined pull due to the exciter voltage and alternating voltage through torque motor 32 is insufficient to overcome the pull of spring 31 contact 37 will engage contact 16 and short circuit resistor 9 to permit the voltage of exciter 5 and the current through field winding 4 to increase. As the voltage of exciter 5 increases and the alternating voltage approaches the value to be maintained contacts 37 and 16 will be separated. This inserts resistor 9 in the main exciter field circuit and the exciter voltage starts to fall. When it has decreased to a certain value the spring 31 will again close the contacts 37 and 16. Thus for a fixed position of arm 14 and contact 16 the main exciter voltage will vary between two values and a certain average value will be obtained. After the operation of the regulator is initiated switch 48' is closed to complete a break in the circuit of the operating coil 44 of the switch operating across resistor 10.

The average exciter voltage thus held will cause a certain voltage to exist at the terminals of the synchronous machine 1. If this exciter voltage is of the proper value to cause the torque of rotor 19 to balance the opposing torque of spring 20, contact 16 will stay in the assumed position and the operation will continue in the manner hereinbefore described. Under balanced voltage conditions in circuit 2 the polyphase currents in the primary winding 18 produce a revolving field which causes induced currents to flow in the rotatable member 19. These induced currents react on the revolving magnetic flux in such a way as to tend to cause the secondary member 19 to be pulled along with the rotary flux. The torque received by the rotatable member 19 is delivered to the contact arm 14 and is balanced by the spring 20 when the voltage of circuit 2 is at the predetermined normal value. If the voltage of circuit 2 increases, the torque of the rotor 19 will exceed the counter-balancing torque of the spring 20 and the contact arm 14 will be moved away from contact 37 and decrease the period during which resistor 9 is short circuited. If the voltage decreases, the torque of rotor 19 will be less than the counter-balancing torque of spring 20 and the contact arm will move closer to contact 37 and increase the period during which resistor 9 is short-circuited. A similar action is obtained on lever 15 by the dynamo-electric means 32 so that when the voltage of the synchronous machine is at its predetermined value the torque motor has no effect upon the contact arm.

Under unbalanced voltage conditions the phase voltage or the line-to-line voltage of the torque motor will contain symmetrical, positive and negative phase sequence components and the torque of the motor will be proportional to the difference between the squares of the magnitudes of the positive phase sequence components and the negative phase sequence components. This insures that the regulator will tend to increase the synchronous machine excitation upon the occurrence of a single phase short-circuit or upon the addition of a heavy single-phase load.

Now assume circuit 2 is subjected to short circuit conditions either of the single-phase or three-phase type. If the voltage on one or all of the phases decreases more than a predetermined amount contact 16 not only makes contact with contact 37 to short circuit resistor 9 but carries through and closes contacts 36 and 37. The engagement of contacts 36 and 37 completes a circuit for solenoid 44 and causes contacts 41 and 42 to be brought into engagement so as to short circuit resistor 10. The resistor 10 is arranged to have a value of resistance such that when short circuited the current in the field winding 7 is sufficient to raise the voltage of exciter 5 to its ceiling value at an enormously high rate of change in volts per second. This increase of voltage to a value appreciably in excess of the value required by Ohm's law to circulate normal full load current through the field winding and at a rate of change of volts per second sufficient to effect a change in excitation in a period of time less than a fraction of a second not only increases the flux of the synchronous machine but increases it so that a large increase in the load than can be carried during short circuit conditions is obtained.

Should the current through field winding 4 exceed a predetermined value, solenoid 53 of switch 49 is energized sufficiently to separate its contacts 50 and 51 and insert resistor 11 in series with the field winding 7 of exciter 5 and prevent the field winding from being damaged.

During the cycle of operation described above, it will be observed that regulator 32 through the vibratory action of its contacts 16 and 37 is arranged to vary resistor 9 to control the voltage of exciter 5 within limits having a maximum value substantially equal to that value required by Ohm's law to circulate normal continuous rated full load current through the field winding and that upon a drop in voltage of the regulated machine below a predetermined value the normal operating limit is increased at a high rate and to a value several times the value required according to Ohm's law to circulate normal continuous rated full load current through the field winding of the synchronous machine.

While I have shown and described a particular embodiment of my invention, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:—

1. In combination, a dynamo-electric machine, a field winding therefor, and electro-responsive means operative in accordance with a predetermined departure of the voltage of said dynamo-electric machine from a predetermined value for applying to said field winding a voltage which is several times higher than the voltage required according to Ohm's law to circulate continuous rated full load field current therethrough.

2. In combination, a synchronous dynamo-electric machine, a field winding therefor, an exciter connected to said field winding, means dependent upon variations of an electrical characteristic of said synchronous machine incident to short-circuit conditions and suddenly applied loads for controlling said exciter to apply to said field winding a voltage which is several times higher than the voltage required according to Ohm's law to circuate continuous rated full load field current therethrough.

3. In combination, a dynamo-electric machine, a field winding therefor, an exciter connected to said field winding having a ceiling voltage at least substantially double the voltage required by Ohm's law to circulate full load field current through said field winding, and means for controlling said exciter in response to the voltage of said dynamo-electric machine.

4. The method of increasing stability in the transmission of power between synchronous dyamo-electric machines which comprises applying to the field windings of said synchronous dynamo-electric machines a voltage at least substantially double the rated voltage of said field windings for full load field excitation when the voltage of said synchronous machines departs a predetermined amount from a predetermined value.

5. The method of increasing the kilovolt-amperes output of a synchronous dynamo-electric machine when subjected to short circuit conditions which comprises increasing the voltage applied to the field winding of said dyamo-electric machine toward a maximum value several times higher than the continuous rated voltage of said field winding at a rate of rise in volts per second substantially in excess of said maximum value in volts.

6. In combination, a dynamo-electric machine, a field winding therefor, a source of electrical energy for said field winding, means responsive to changes in an electrical characteristic of said dynamo-electric machine within prearranged limits for effecting a change in an electrical characteristic of said source within predetermined limits and responsive to a change in an electrical characteristic of said dynamo-electric machine exceeding said prearranged limits for establishing a higher maximum limit than the maximum limit of the first mentioned predetermined limits for the limit of change in an electrical characteristic of said source.

7. In combination, a dynamo-electric machine, a field winding therefor, a source of electrical energy for said field winding, means responsive to a predetermined change in the voltage of said dynamo-electric machine for variably controlling said source of electrical energy to vary the voltage impressed on said field winding within predetermined limits and responsive to a predetermined change of greater magnitude than said first mentioned change for increasing the voltage impressed upon said field winding to a value several times greater than the maximum of said predetermined limits.

8. In combination, a synchronous dynamo-electric machine, an excitation circuit therefor, means for varying an electrical characteristic of said excitation circuit within limits having a predetermined maximum value during a departure of a predetermined amount of an electrical characteristic of said synchronous machine from a predetermined value, and means for varying an electrical characteristic of said excitation circuit within limits having a maximum value substantially in excess of said first mentioned maximum value during a departure of the electrical characteristic of said synchronous machine exceeding said predetermined amount.

9. In combination, a power transmission circuit, a synchronous polyphase dynamo-electric machine connected thereto, an excitation circuit for said synchronous machine, a source of electrical energy for energizing said excitation circuit, means responsive to an electrical characteristic of said synchronous machine for causing said source of electrical energy to supply a voltage up to a predetermined maximum value to said excitation circuit for predetermined disturbances in said transmission circuit, and means responsive to an electrical characteristic of said synchronous machine for causing said source of electrical energy to supply a voltage several times in excess of said maximum value for other predetermined disturbances in said transmission circuit.

10. In combination, a power transmission circuit, a synchronous polyphase dynamo-electric machine connected thereto, an excitation circuit for said synchronous machine, a source of electrical energy for energizing said excitation circuit, means for changing an electrical characteristic of said source of electrical energy to a predetermined maximum value and at a predetermined rate under conditions of steady state and dynamic stability in said transmission circuit, and means for changing said electrical characteristic of said source of electrical energy to a higher predetermined maximum value and at a higher predetermined rate than said first mentioned maximum value and rate upon the occurrence of short circuit conditions in said transmission circuit.

11. In a system of power transmission, a transmission circuit, a synchronous dynamo-electric machine connected to said circuit, a field winding for said synchronous machine, means for increasing the voltage applied to said field winding to a predetermined maximum value for changes of voltage in said circuit of a predetermined amount, and means for increasing the voltage applied to said field winding to a value several times higher than said maximum value for changes in voltage exceeding said predetermined amount.

12. In combination, a synchronous dynamo-electric machine, a field winding therefor, an exciter connected to said field winding which is capable of generating a voltage greatly in excess of the voltage required to circulate the required current through said field winding when said dynamo-electric machine is operating at its continuous rated output, and means responsive to an electrical characteristic of said synchronous dynamo-electric machine for increasing the voltage of said exciter to its maximum value when said electrical characteristic departs a predetermined amount from a predetermined value.

13. In combination, a synchronous dynamo-electric machine, an excitation circuit therefor, a high-ceiling exciter having a separately energized field winding and connected to energize said excitation circuit, a source of electrical energy connected to energize said field winding, and means responsive to an electrical characteristic of said synchronous dynamo-electric machine for controlling said source of electrical energy to increase the voltage of said exciter to its ceiling value upon a predetermined departure of said electrical characteristic from a predetermined value.

14. In combination, a dynamo-electric machine, a field winding therefor, a second dynamo-electric machine having an armature winding connected to energize said field winding, a separate source of electrical energy for energizing the field winding of said second dynamo-electric machine, a plurality of means interposed between said source of electrical energy and the field winding of said second dynamo-electric machine for varying an electrical characteristic of said second dynamo-electric machine, and means responsive to an electrical characteristic of said first mentioned dynamo-electric machine for controlling one of said plurality of means when the variation from a predetermined value in an electrical characteristic of said first mentioned dynamo-electric machine is of a predetermined amount, and means for controlling an additional one of said plurality of means when said variation exceeds said predetermined amount.

15. In combination, a synchronous dynamo-electric machine, an excitation circuit therefor, an exciter having its armature connected to said excitation circuit, a separately excited field winding for said exciter, a source of electrical energy for energizing said exciter field winding, a plurality of resistors interposed between said source of electrical energy and said exciter field winding for controlling an electrical characteristic of said exciter, means responsive to variations in an electrical characteristic of said synchronous machine of a predetermined amount for controlling one of said resistors, means responsive to variations in an electrical characteristic in excess of said predetermined amount for controlling another of said resistors, and electroresponsive means responsive to a predetermined value of an electrical characteristic of said excitation circuit for controlling another of said resistors.

16. In combination, a power transmission circuit, a polyphase dynamo-electric machine connected thereto, an excitation circuit for said synchronous machine, a plurality of resistors connected in series with said excitation circuit, a regulator responsive to the voltage of said synchronous machine for controlling one of said resistors, means associated with another of said resistors for maintaining a shunt circuit thereto normally open, means associated with another of said resistors for maintaining a shunt circuit thereto normally closed, means responsive to a predetermined value of the voltage of said synchronous machine for controlling said first mentioned means to close the circuit in shunt to the resistor with which it is associated, and means responsive to a predetermined current in said excitation circuit for controlling said second mentioned means to open the circuit in shunt to the resistor with which it is associated.

17. In combination, an electrical distribution circuit, a polyphase synchronous dynamo-electric machine connected thereto, an excitation circuit for said synchronous machine, a high ceiling exciter connected to energize said excitation circuit, a field winding for said exciter, a plurality of resistors arranged to be cut in and out to control the energization of said field winding, switches for cutting in and out some of said resistors, regulating means connected to be responsive to an electrical characteristic of each phase of said distribution circuit for periodically cutting in and out another of said resistors to cause operation of said exciter within limits below its ceiling voltage when the departure of an electrical characteristic of said synchronous machine is less than a predetermined amount and for controlling one of said switches to cause operation of said exciter up to its ceiling voltage when said departure is greater than said predetermined amount.

18. In combination, a power transmission circuit, a synchronous polyphase dynamo-electric machine connected thereto, an excitation circuit for said synchronous machine, an exciter connected to said excitation circuit and adapted to generate under predetermined conditions a maximum voltage several times greater than the voltage required according to Ohm's law to circulate full load current through said excitation circuit, a field winding for said exciter, resistors connected to said field circuit and arranged to be cut in and out to control the voltage of said exciter, switches for cutting in and out some of said resistors, a vibrating regulator connected to be operative in accordance with the voltage on each phase of said distribution circuit for controlling others of said resistors to cause operation of said exciter within limits having a maximum value substantially equal to the continuous rated voltage of said excitation circuit when the departure of the voltage of said synchronous machine is less than a predetermined amount and for controlling one of said switches to cause operation of said exciter up to its extreme maximum limit when said departure is greater than said predetermined amount, and means connected to be responsive to a predetermined current in said excitation circuit for controlling the other of said switches.

In witness whereof, I have hereunto set my hand this 25th day of November, 1927.

ROBERT H. PARK.